United States Patent [19]
Branstad et al.

[11] Patent Number: 5,706,461
[45] Date of Patent: *Jan. 6, 1998

[54] METHOD AND APPARATUS FOR IMPLEMENTING VIRTUAL MEMORY HAVING MULTIPLE SELECTED PAGE SIZES

[75] Inventors: Mark William Branstad; Jonathan William Byrn; Gary Scott Delp; Philip Lynn Leichty, all of Rochester; Kevin Gerard Plotz, Byron; Fadi-Christian E. Safi, Rochester; Albert Alfonse Slane, Oronoco, all of Minn.

[73] Assignee: International Business Machines Corporation, Armonk, N.Y.

[*] Notice: The term of this patent shall not extend beyond the expiration date of Pat. No. 5,555,387.

[21] Appl. No.: 638,223

[22] Filed: Apr. 26, 1996

Related U.S. Application Data

[63] Continuation of Ser. No. 467,266, Jun. 6, 1995, Pat. No. 5,555,387, which is a continuation of Ser. No. 25,639, Mar. 2, 1993, abandoned.

[51] Int. Cl.$^6$ .................. G06F 12/00; G06F 12/04; G06F 12/10
[52] U.S. Cl. .................. 395/413; 395/410; 395/412; 395/416; 395/418; 395/419; 395/421.1
[58] Field of Search .................. 395/410, 412, 395/413, 416, 418, 421.1, 419, 497.01

[56] References Cited

U.S. PATENT DOCUMENTS

| | | | |
|---|---|---|---|
| 5,012,408 | 4/1991 | Conroy | 395/497.03 |
| 5,125,086 | 6/1992 | Perazzoli, Jr. | 395/486 |
| 5,237,673 | 8/1993 | Orbits et al. | 395/497.01 |
| 5,247,632 | 9/1993 | Newman | 395/497.01 |
| 5,247,638 | 9/1993 | O'Brien et al. | 395/888 |
| 5,263,140 | 11/1993 | Riordan | 395/417 |
| 5,446,854 | 8/1995 | Khalidi et al. | 395/401 |
| 5,555,387 | 9/1996 | Branstad et al. | 395/419 |

OTHER PUBLICATIONS

Computer Organization and Design, Hennessy et al., 1994, pp.481–503.

IBM Technical Disclosure Bulletin, vol. 37, No. 07, Jul. 1994; pp.89–94 entitled "Variable Paged Array Datatype" by K. Chapman.

IBM Technical Disclosure Bulletin, vol. 36, No. 6A, Jun. 1993 entitled "Efficient Method for Providing Virtually Unlimited Length Arrays in Systems that Support Virtual Memory Segments" by D.L. Campbell et al.

IBM TDB, vol.37, No.07, pp.89–94 entitled "Variable Paged Array Data Type" by Chapman, Jul. 1994.

Primary Examiner—Tariq R. Hafiz
Assistant Examiner—Than V. Nguyen
Attorney, Agent, or Firm—Joan Pennington

[57] ABSTRACT

A method and apparatus for implementing virtual memory having multiple selected page sizes are provided. A virtual address includes a map index and a frame offset. A selector mechanism receives the virtual address frame offset and generates an offset and index. A frame map table indexes the virtual address map index and the selector generated index and generates a base address. The frame map table generated base address and the selector generated offset are combined to provide a physical address.

12 Claims, 18 Drawing Sheets

EXAMPLE 1

| INDEX | SIZE | BOUNDARY | FRAME OFFSET | 5 | | |
|---|---|---|---|---|---|---|
| | | | SUBTRACTORS | OFFSET | LIMIT | INDEX |
| 0 | 0 | 0 | 5 | 5 | 0 | 0 |
| 1 | 128 | 128 | -123 | 0 | 123 | 0 |
| 2 | 512 | 640 | -635 | 0 | 0 | 0 |
| 3 | 1024 | 1664 | -1659 | 0 | 0 | 0 |
| 4 | 1024 | 2688 | -2683 | 0 | 0 | 0 |
| 5 | 1024 | 3712 | -3707 | 0 | 0 | 0 |
| 6 | 1024 | 4736 | -4731 | 0 | 0 | 0 |
| 7 | 4096 | 8832 | -8827 | 0 | 0 | 0 |
| 8 | 4096 | 12928 | -12923 | 0 | 0 | 0 |
| 9 | 4096 | 174024 | -17019 | 0 | 0 | 0 |
| 10 | 8192 | 25216 | -25211 | 0 | 0 | 0 |
| 11 | 8192 | 33408 | -33403 | 0 | 0 | 0 |
| 12 | 8192 | 41600 | -41595 | 0 | 0 | 0 |
| 13 | 8192 | 49792 | -49787 | 0 | 0 | 0 |
| 14 | 8192 | 57984 | -57979 | 0 | 0 | 0 |
| 15 | 8192 | 66176 | -66171 | 0 | 0 | 0 |
| 16 | 8192 | 74368 | -74363 | 0 | 0 | 0 |
| | | | RESULTS=> | 5 | 123 | 0 |
| | | | ERROR => | FALSE | | |

FIG.10

EXAMPLE 2

| INDEX | SIZE | BOUNDARY | SUBTRACTORS | OFFSET | LIMIT | INDEX |
|---|---|---|---|---|---|---|
| | | FRAME OFFSET | 1500 | | | |
| | | | | | | |
| 0 | 0 | 0 | 1500 | 0 | 0 | 0 |
| 1 | 128 | 128 | 1372 | 0 | 0 | 0 |
| 2 | 512 | 640 | 860 | 860 | 0 | 2 |
| 3 | 1024 | 1664 | -164 | 0 | 164 | 0 |
| 4 | 1024 | 2688 | -1188 | 0 | 0 | 0 |
| 5 | 1024 | 3712 | -2212 | 0 | 0 | 0 |
| 6 | 1024 | 4736 | -3236 | 0 | 0 | 0 |
| 7 | 4096 | 8832 | -7332 | 0 | 0 | 0 |
| 8 | 4096 | 12928 | -11428 | 0 | 0 | 0 |
| 9 | 4096 | 174024 | -15524 | 0 | 0 | 0 |
| 10 | 8192 | 25216 | -23716 | 0 | 0 | 0 |
| 11 | 8192 | 33408 | -31908 | 0 | 0 | 0 |
| 12 | 8192 | 41600 | -40100 | 0 | 0 | 0 |
| 13 | 8192 | 49792 | -48292 | 0 | 0 | 0 |
| 14 | 8192 | 57984 | -56484 | 0 | 0 | 0 |
| 15 | 8192 | 66176 | -64676 | 0 | 0 | 0 |
| 16 | 8192 | 74368 | -72868 | 0 | 0 | 0 |
| | | | RESULTS=> | 860 | 164 | 2 |
| | | | ERROR => | FALSE | | |

FIG.11

EXAMPLE 3

| INDEX | SIZE | BOUNDARY | FRAME OFFSET | 66177 | | |
|---|---|---|---|---|---|---|
| | | | SUBTRACTORS | OFFSET | LIMIT | INDEX |
| 0 | 0 | 0 | 66177 | 0 | 0 | 0 |
| 1 | 128 | 128 | 66049 | 0 | 0 | 0 |
| 2 | 256 | 384 | 65793 | 0 | 0 | 0 |
| 3 | 256 | 640 | 65537 | 0 | 0 | 0 |
| 4 | 1024 | 1664 | 64513 | 0 | 0 | 0 |
| 5 | 1024 | 2688 | 63489 | 0 | 0 | 0 |
| 6 | 1024 | 3712 | 62465 | 0 | 0 | 0 |
| 7 | 4096 | 7808 | 58369 | 0 | 0 | 0 |
| 8 | 4096 | 11904 | 54273 | 0 | 0 | 0 |
| 9 | 4096 | 16000 | 50177 | 0 | 0 | 0 |
| 10 | 8192 | 24192 | 41985 | 0 | 0 | 0 |
| 11 | 8192 | 32384 | 33793 | 0 | 0 | 0 |
| 12 | 8192 | 40576 | 25601 | 0 | 0 | 0 |
| 13 | 8192 | 48786 | 17409 | 0 | 0 | 0 |
| 14 | 8192 | 56960 | 9217 | 0 | 0 | 0 |
| 15 | 8192 | 65152 | 1025 | 0 | 0 | 0 |
| 16 | 384 | 65536 | 641 | 0 | 0 | 0 |
| | | | RESULTS => | 0 | 0 | 0 |
| | | | ERROR => | TRUE | | |

FIG.12

METHOD AND APPARATUS FOR IMPLEMENTING VIRTUAL MEMORY HAVING MULTIPLE SELECTED PAGE SIZES

This application is a continuation of application Ser. No. 08/467,266 filed Jun. 6, 1995, which is a continuing application of application Ser. No. 08/025,639, filed Mar. 2, 1993.

FIELD OF THE INVENTION

The present invention relates to a method and apparatus for implementing virtual memory having multiple selected page sizes, and more particularly to a memory management system and method for implementing virtual memory which uses pools of multiple size buffers to store statistically predictable variable but bounded length data buffers for communications, multimedia or other systems that benefit from efficient utilization of memory.

DESCRIPTION OF THE PRIOR ART

FIG. 1 illustrates a prior art virtual memory arrangement where pages are mapped by a mapping mechanism from a virtual address to a physical address. FIG. 2 illustrates a traditional form of the mapping mechanism. The virtual address includes a page identifier and an offset in page. The virtual address page identifier is indexed with a page table. The page table includes a physical page address and a valid bit indicating whether the mapping is valid. If a valid bit is on, the page table supplies the physical page number or starting address of the page in memory. If the valid bit is off, then the page is not present in memory. The physical address includes the physical page base address concatenated with the virtual address offset in page. FIG. 3 illustrates the traditional form of segmented virtual address mapping for a variable-size data block. In the segmented virtual memory, the virtual address also includes a segment identifier that is indexed to a segment table including a valid bit, a page table address, and page table size. The virtual address page identification and the segment table page table size are supplied to a size check function. The size check function output and the segment table base page address is indexed to a page table. The offset in page is concatenated with the physical base page address to produce the physical address.

Typically, virtual memory implementations, including segmented virtual memory, are based on fixed size buffers or pages. In some communications systems and in a multimedia environment, the use of fixed size buffers or pages leads to sub-optimal use of memory. Having many small pages induces an excess amount of memory management overhead. Having a smaller number of large pages decrease memory utilization. Using an intermediate page size can result in extra management overhead with decreased memory utilization.

In some communication systems, data frames are received from the network in small units called cells with arrival times interleaved with cells from other data frames. Asynchronous transfer mode (ATM) is an example of such a communications network. The cells are assembled to form larger data structures called frames. Until the last cell of a frame is received, the size of the final data structure (the frame) is not known. If the frame is to be managed as a contiguous memory object, this means that memory must be allocated for the largest size frame that will be received from the network. This can be very wasteful of memory.

It is possible to use linked lists and other structures to provide better granularity of memory utilization. Using these data structures in software carries with it the penalty of having to traverse lists, and to perform other address resolution operations to access the right area of memory. This is not an efficient operation when the data must be accessed randomly. Managing the data structures also increases processor workload. Doing a copy to a contiguous area of memory is not appealing, from either a performance or a memory utilization viewpoint.

SUMMARY OF THE INVENTION

Important objects of the present invention are to provide an improved method and system for implementing virtual memory; to provide such method and system having multiple selected page sizes; to provide such method and system which provides the appearance that the frame resides in a contiguous address space, without requiring the overhead of allocating a maximum sized buffer for each frame; and to provide such method and system overcoming disadvantages of prior art arrangements.

In brief, a method and apparatus for implementing virtual memory having multiple selected page sizes are provided. A virtual address includes a map index and a frame offset. A selector mechanism receives the virtual address frame offset and generates an offset and index. A frame map table indexes the virtual address map index and the selector generated index and generates a base address. The frame map table generated base address and the selector generated offset are combined to provide a physical address.

BRIEF DESCRIPTION OF THE DRAWINGS

The present invention, together with the above and other objects and advantages may best be understood from the following detailed description of the preferred embodiments of the invention illustrated in the drawings, wherein:

FIGS. 10, 11 and 12 provide examples of the results provided by the boundary logic function of FIG. 9;

DETAILED DESCRIPTION OF THE PREFERRED EMBODIMENTS

Figure 1:
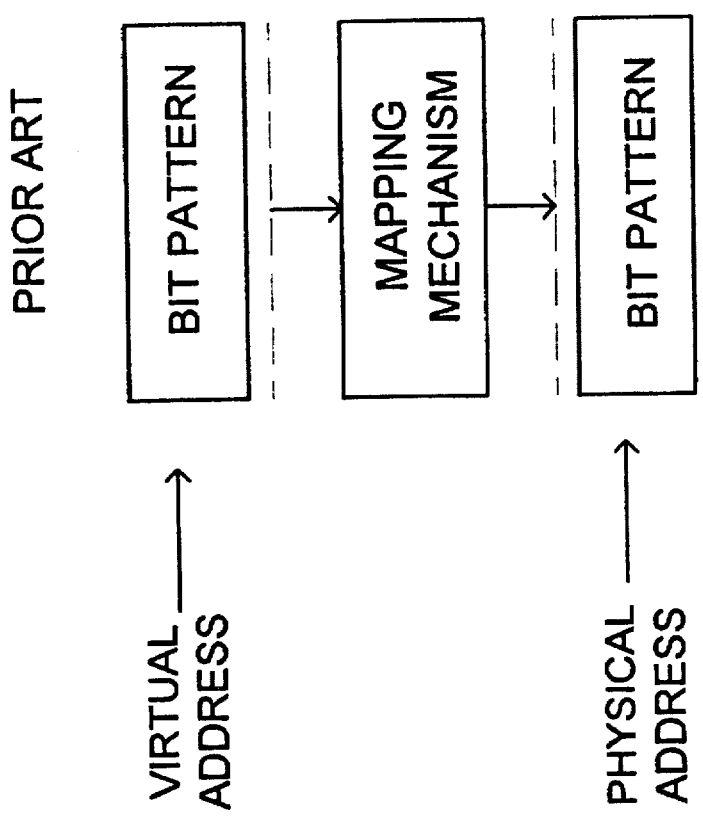
FIG. 1 is a block diagram illustrating a prior art virtual address arrangement.
Figure 2:
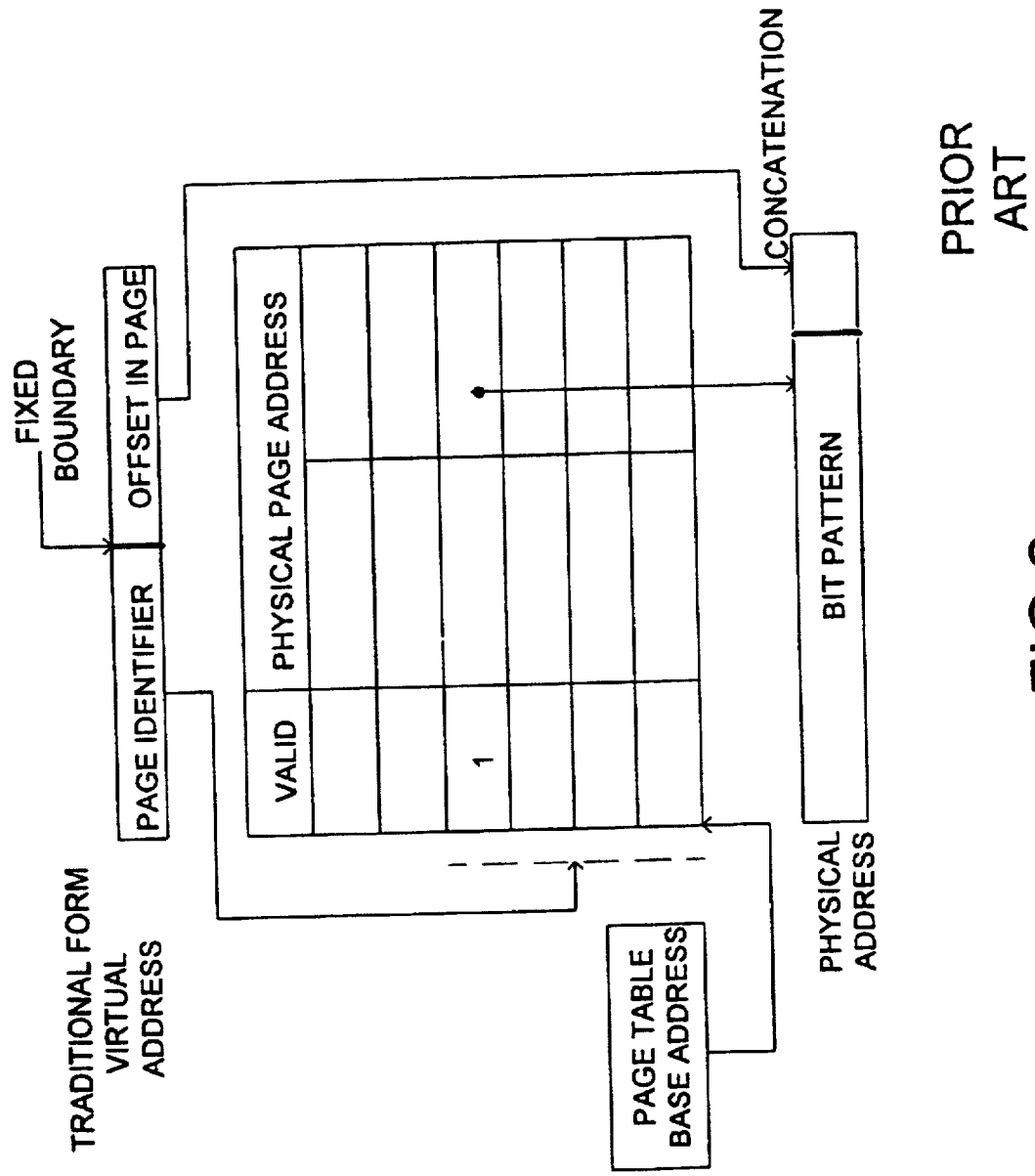
FIG. 2 is a block diagram illustrating a prior art traditional form of virtual address mapping.
Figure 3:
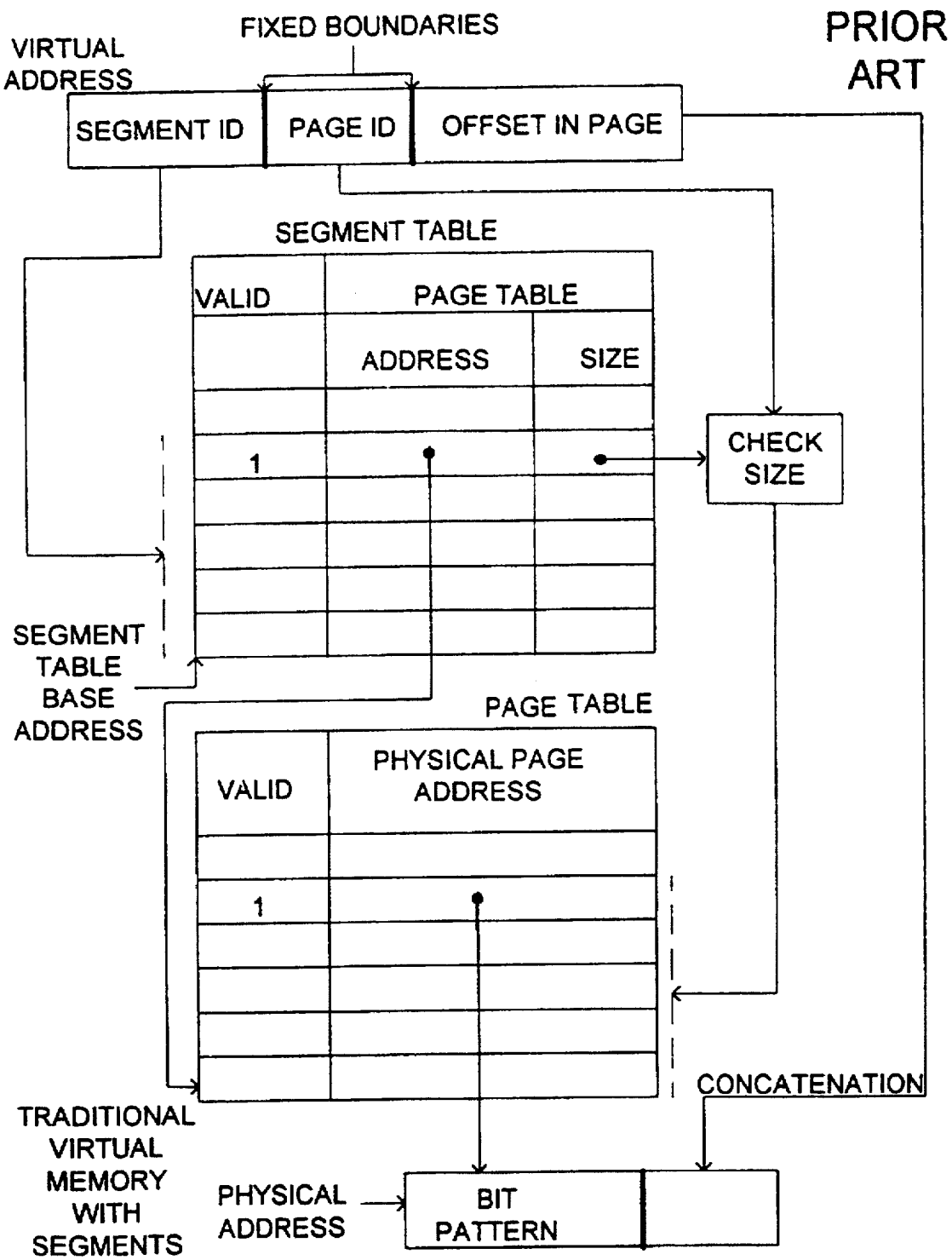
FIG. 3 is a block diagram illustrating a prior art traditional form of segmented virtual address mapping.
Figure 4:
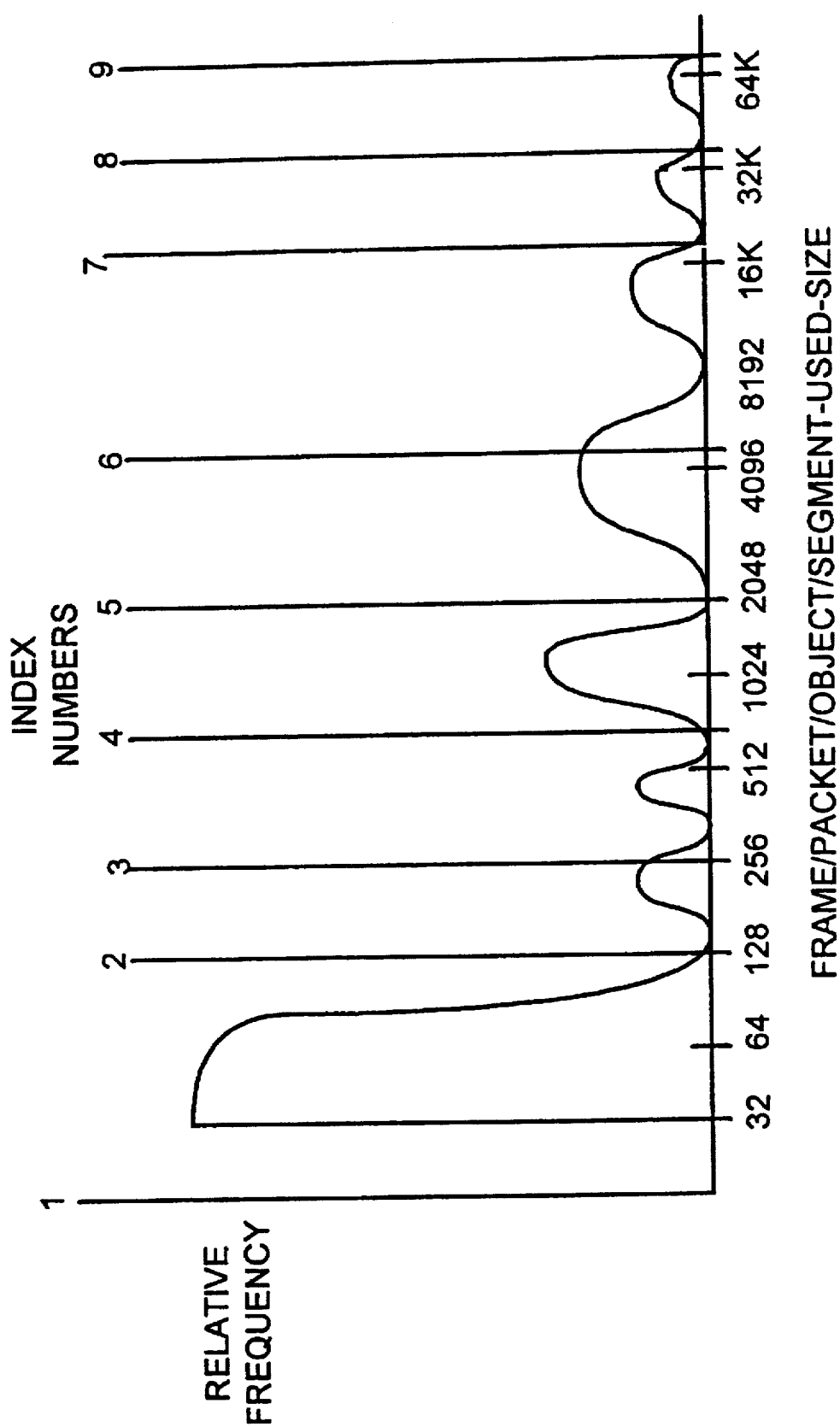
FIG. 4 is a chart illustrating a probability distribution of frame lengths for a virtual memory system of the invention.

FIG. 4 shows a typical probability distribution of frame lengths for a virtual memory (VM) system. Relative frequency of the distribution of data frame sizes, packet sizes, object sizes, or the used portion of an allocated data segment is shown. In FIG. 4, the peaks of length frequency are approximately evenly spaced along the log scale. Vertical lines labeled 1–9 represent index numbers representing boundary values used in accordance with the invention for selecting one of the multiple selected page sizes. Even though FIG. 4 shows an approximately, evenly spaced distribution, the method of the invention can be used to store various statistically predictable variable but bounded length data buffers.

To support a VM system for the illustrated probability distribution of FIG. 4, using a fixed page size of very large pages results in significant internal fragmentation and memory wastage on small frames. Alternately, when using small fixed page sizes, a large page table is required to support the large frames. This large page table would be used for the small frames as well. This also results in memory wastage.

In accordance with the invention, multiple selected page sizes are used to provide effective memory utilization and effective memory management. The virtual memory (VM) management system of the invention uses pools of multiple selected size buffers to store statistically predictable variable but bounded length data buffers for communications, multimedia and other systems that would benefit from efficient utilization of memory. Like traditional virtual memory, the multiple selected page size virtual memory system of the invention presents a contiguous address space. Also like the traditional VM, not all of the virtual memory address space that is available has actual physical memory currently attached to it. The physical memory is allocated as the address space is used and recovered when the address segment or frame is deallocated or freed.

Figure 6:
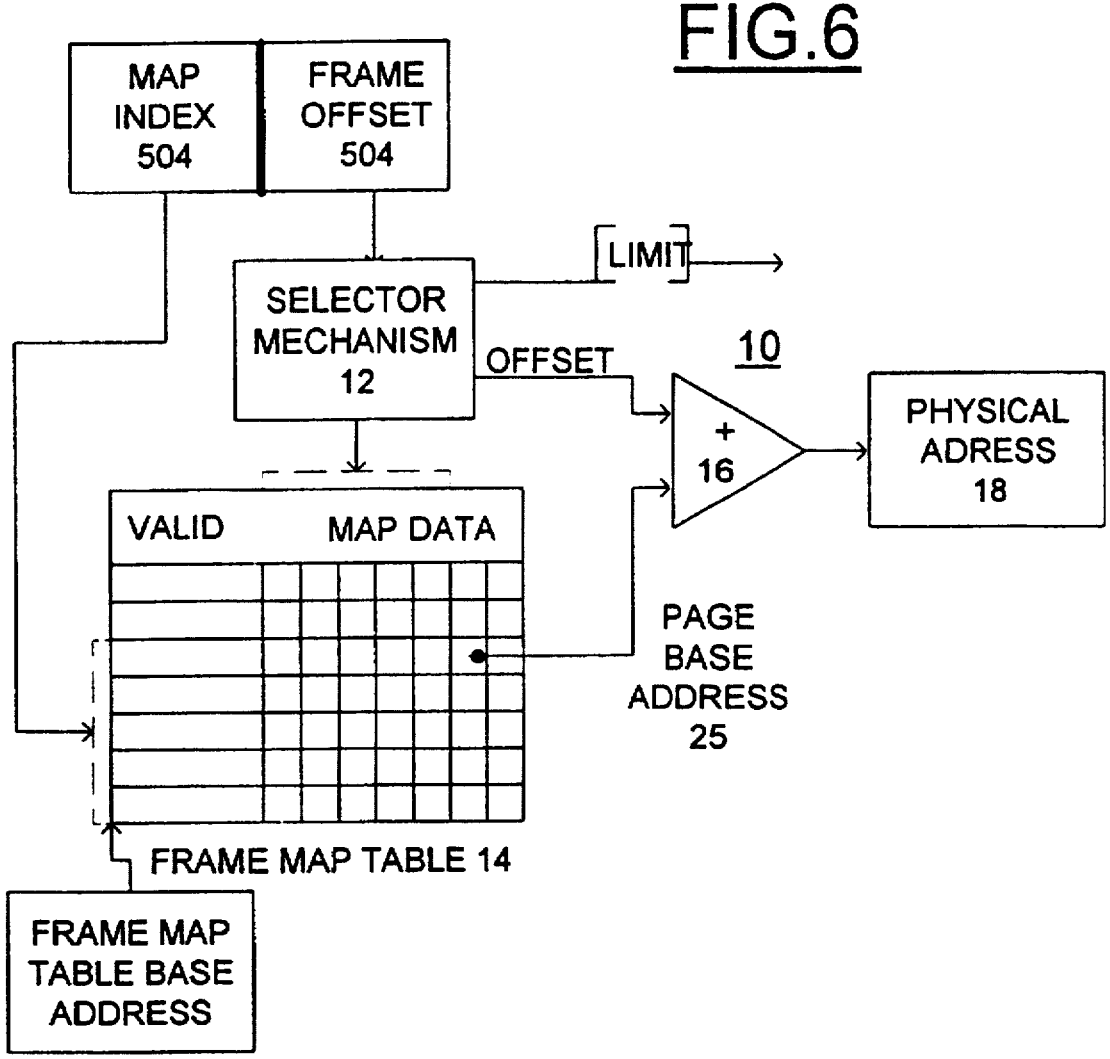
FIG. 6 is a block diagram illustrating a virtual address system of the invention.

FIG. 6 is a block diagram illustrating the virtual address system of the invention generally designated by 10. The virtual address includes the Map Index and the Frame Offset. A selector mechanism 12 generates an Offset and the Index which represent boundaries of the Index Number of FIG. 4. The Offset from the selector mechanism 12 represents the distance from an Index Number 1–9 of FIG. 4. The address space between each boundary pair in FIG. 4 either has no memory associated with it or behind it or has a page of selected size providing physical storage because a multiplicity of sizes are used in this invention. The boundaries can be placed right after the probability peaks. This results in efficient memory utilization and a small map table. The Map Index 502 is indexed together with the Index from selector mechanism 12 with a frame map table 14 that provides a page base address. The frame map table 14 includes a map data and a valid bit indicating whether the mapping is valid. The page base address from the map table data and the Offset from the selector mechanism 12 are applied to an adder 16 providing a physical address 18.

Figure 5:
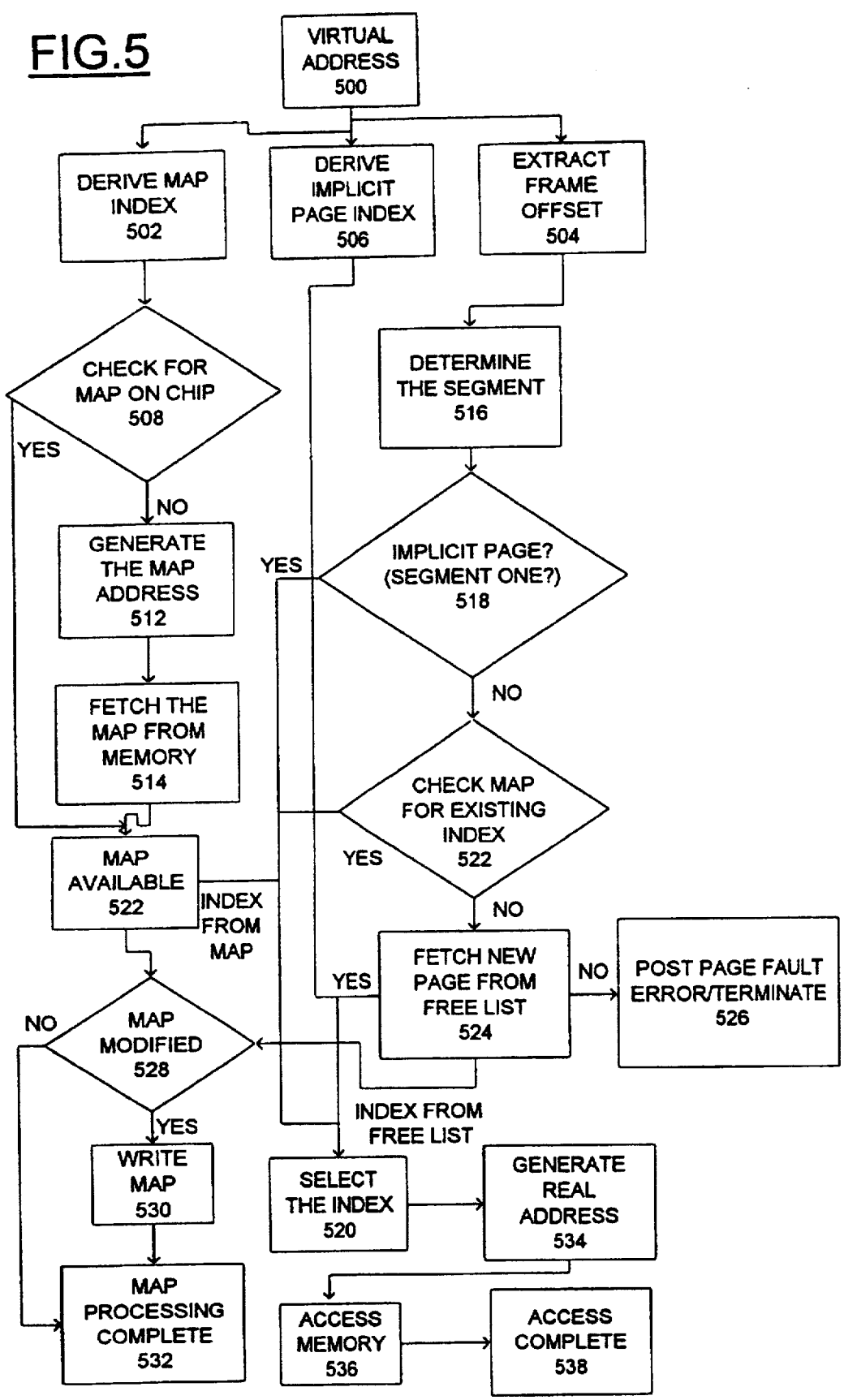
FIG. 5 is a logical block and data flow diagram illustrating a virtual memory management method and system of the invention.

FIG. 5 is a logical block and data flow diagram illustrating the virtual memory management method of the invention with data parsed from the virtual address and how that data is used during a memory access cycle. A virtual address is shown at a block 500. Virtual address 500 contains a Map Index derived at a block 502 and a Frame Offset derived at a block 504. The upper order bits of the virtual address contain the Map Index 502 which is also used as the Implicit Page Index at a block 506. The first page of the segment is addressed implicitly by the segment index with a one-to-one correspondence between the segment and the implicit first page. All frame address ranges have this implicit page index 506 which is a minimum amount of memory storage space allocated for each frame without additional address manipulation.

A check for a Map on chip is provided at a block 508. If the map is available, the data access is indexed from the map at a block 510. Otherwise, the map address is generated at a block 512 and the map is fetched from memory at a block 514.

The low order bits of the virtual address contain the Frame Offset 504. The Frame Offset 504 is used to determine which segment the access falls in and the location within that segment of the addressed memory location at a block 516. The Frame Offset 504 is illustrated and described in greater detail in FIG. 8. If determined that the memory location falls in the Implicit Page (or Segment One) at a decision block 518, no map reference is necessary and the index is selected at a block 520. However, if the Frame Offset is beyond the Implicit Page, the Page Map must be accessed to determine if a page has already been allocated for this space at a decision block 522. If it has not yet been assigned, a free page is taken from the free page list at a block 524. If no pages are available, the cycle terminates with errors posted at a block 526. Otherwise, the page index is stored in the Page Map at a decision block 528. If determined that the page Map for this virtual address has been changed at block 528, it must be marked for writing back to memory at some point. The map is written at block 530 with map processing completed at a block 532.

The Page Index is then used to generate the physical address at a block 534. The physical address is then used to access memory at a block 536. When the access is complete the cycle terminates normally at a block 538.

Figure 7:
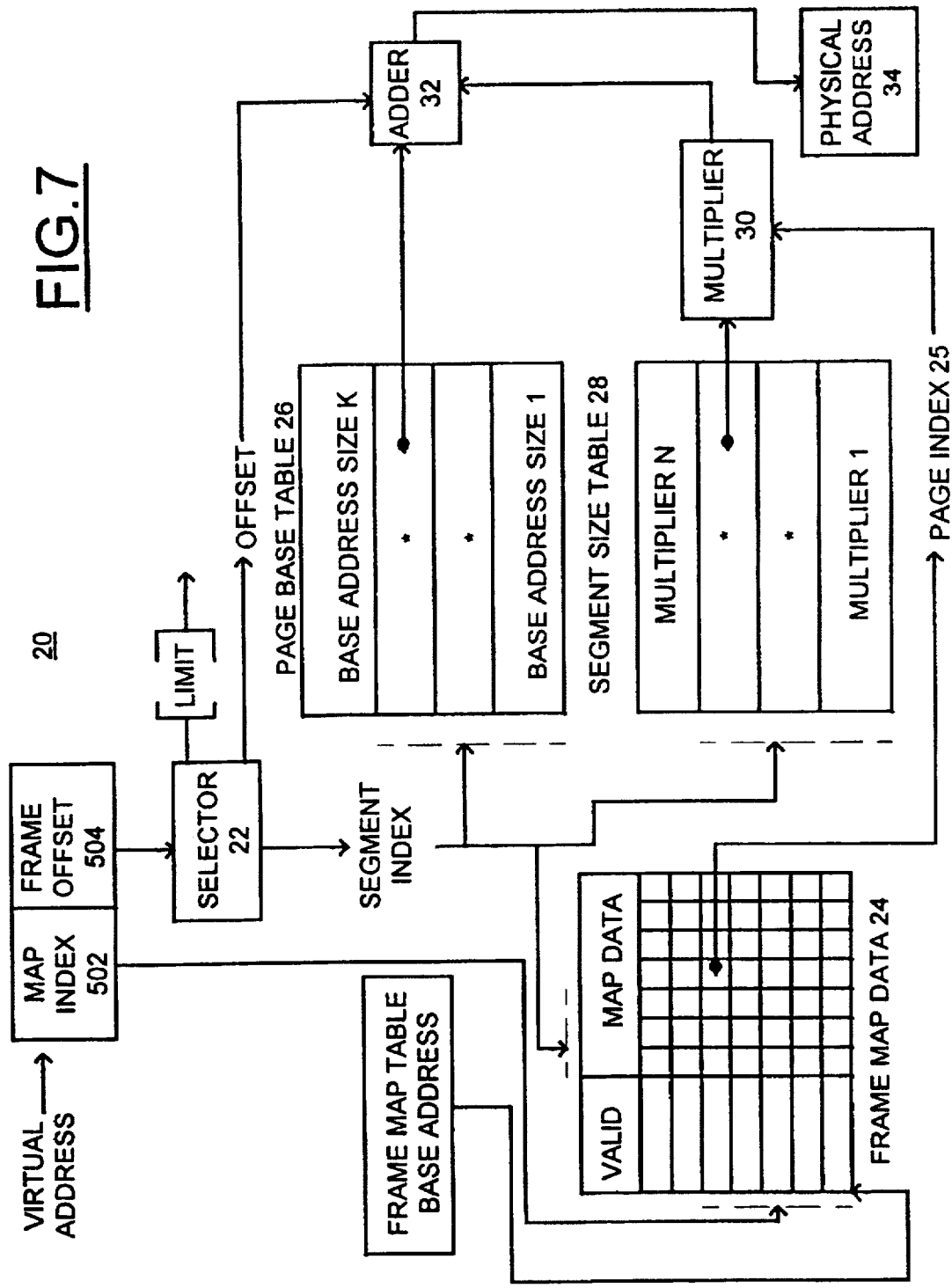
FIG. 7 is a block diagram illustrating a preferred embodiment of a virtual address system of the invention.

FIG. 7 is a block diagram illustrating a preferred embodiment of a virtual memory system generally designated by 20. VM system 20 includes a selector 22 that provides a Segment Index, Offset and an optional Limit. The Limit may be used to represent the number of additional addresses for this translation, so that the physical address can be incremented corresponding to the limit without doing an additional translation. The limit is useful for calculating burst limits in and out of memory. The Map Index is indexed together with the Segment Index from selector mechanism 22 with a frame map table 24 that provides a frame map table base address. The Segment Index is indexed to a page base table 26 and a segment size table 28. The page index 25 from the frame map data 24 is multiplied by a segment size from arbitrary boundary from the segment size table 28 by a multiplier 30. The base address size 1–K of page base table 26, the Offset of selector mechanism 22 and the multiplier output are applied to an adder 32 providing a physical address 34.

It is not necessary for each index to have its own additional size. Indexes may share both size and memory pools.

Figure 8:
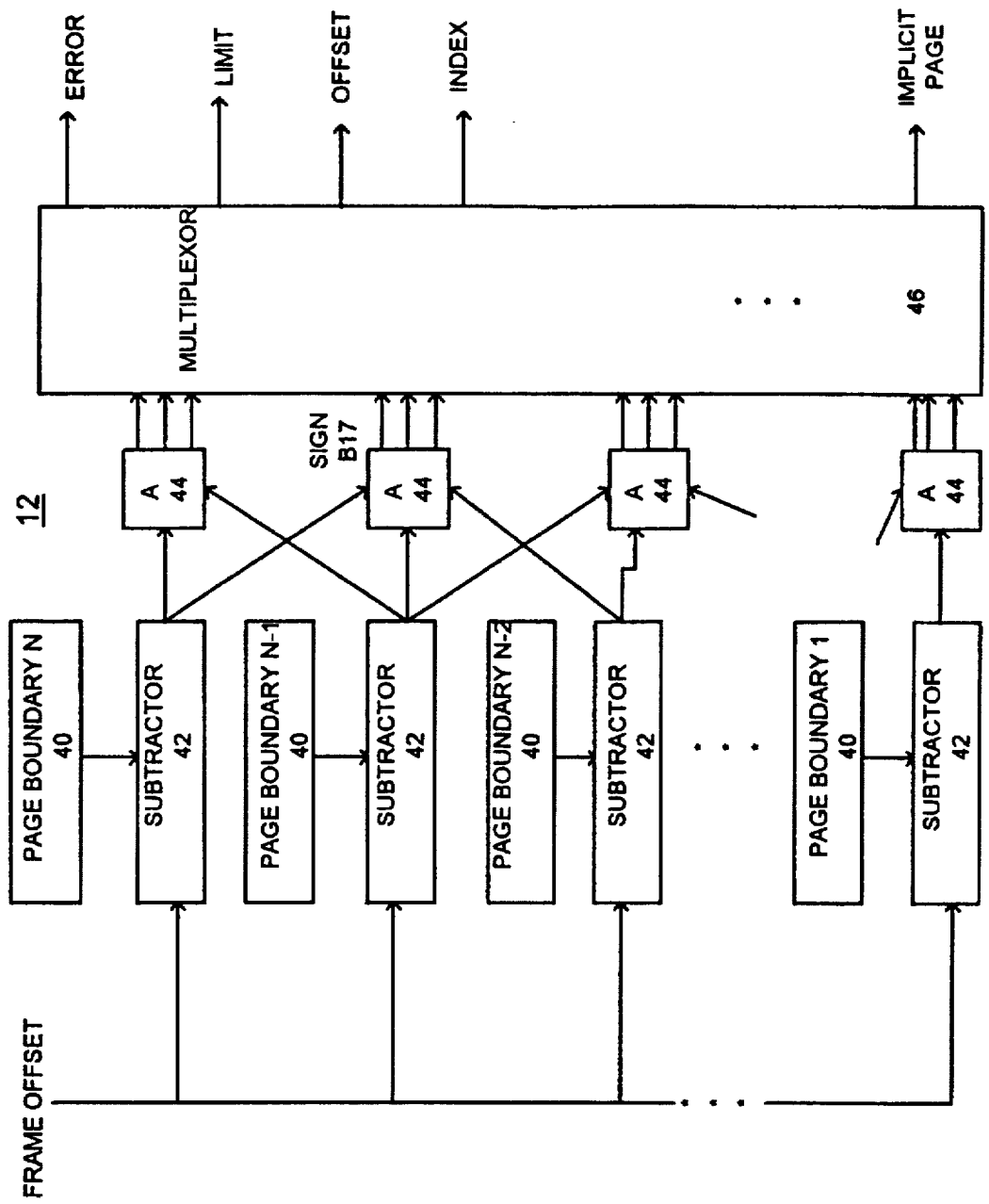
FIG. 8 illustrates an arrangement for a selector mechanism of the virtual address system of FIG. 6.

FIG. 8 illustrates an arrangement for the selector mechanism 12. Selector 12 includes a plurality of predefined page boundary blocks 40 (1 through N) used in conjunction with an array of subtractors 42. The frame offset 504 is applied to the subtractors 42 to determine the particular segment in the page map should be used. The outputs of subtractors 42 are applied to a corresponding boundary logic block 44 (A) coupled to a multiplexor 46. The structure of the boundary logic block 44 is illustrated and described with respect to FIG. 9. Multiplexor 46 provides the Offset, Index and optional Implicit Page, Limit and Error outputs.

Figure 9:
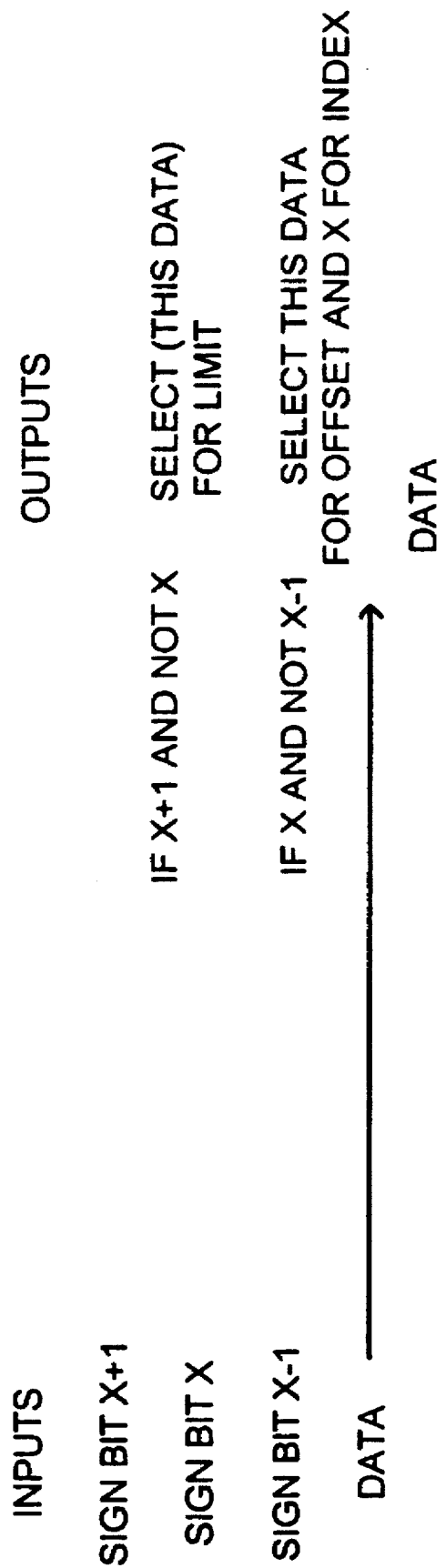
FIG. 9 illustrates a boundary logic function of the selector mechanism of FIG. 8.

Referring to FIG. 9, the boundary logic function 44 receives inputs of sign bit X+1, sign bit X, sign bit X-1 and data, where sign bit X is true if Frame Offset—Boundary X is greater than or equal to zero. The outputs selected include if X+1 and Not X is true, then this data is selected for the Limit; if X and Not X-1 is true, then select this data for the Offset and X for the index; and the data. If the page selected is page 1, then the implicit page is selected.

FIGS. 10, 11 and 12 provide examples of the Offset, Limit, Index and Error results provided by selector 12 including the subtractors 42, boundary logic function 44. In FIG. 10, an Offset of 5, a Limit of 123, and an Index of 0 are provided with a Frame Offset of 5. In FIG. 11, an Offset of 860, a Limit of 164, and an Index of 2 are provided with a Frame Offset of 1500. In FIG. 12, an error is generated from the frame Frame Offset of 66177.

Figure 13:
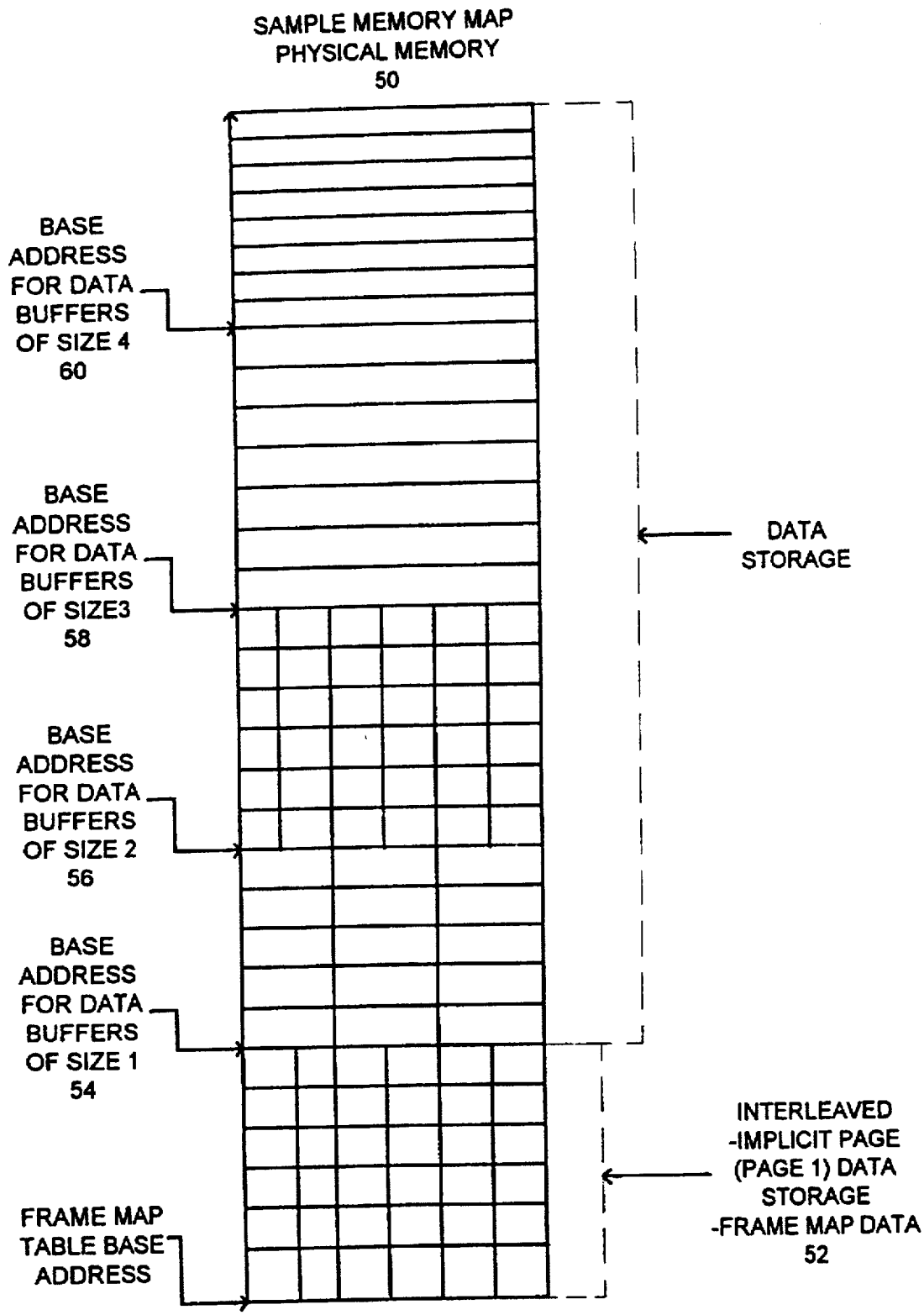
FIG. 13 provides an example of a memory map of the invention.

FIG. 13 provides an example of a memory map 50 that includes a first data buffer 52 for storing an interleaved map and implicit page and a plurality of data buffers 54, 56, 58 and 60 of the multiple selected page sizes 1, 2, 3 and 4 for storing data. The implicit page is not required to be included or interleaved but the preferred embodiment benefits from both.

Figure 14:
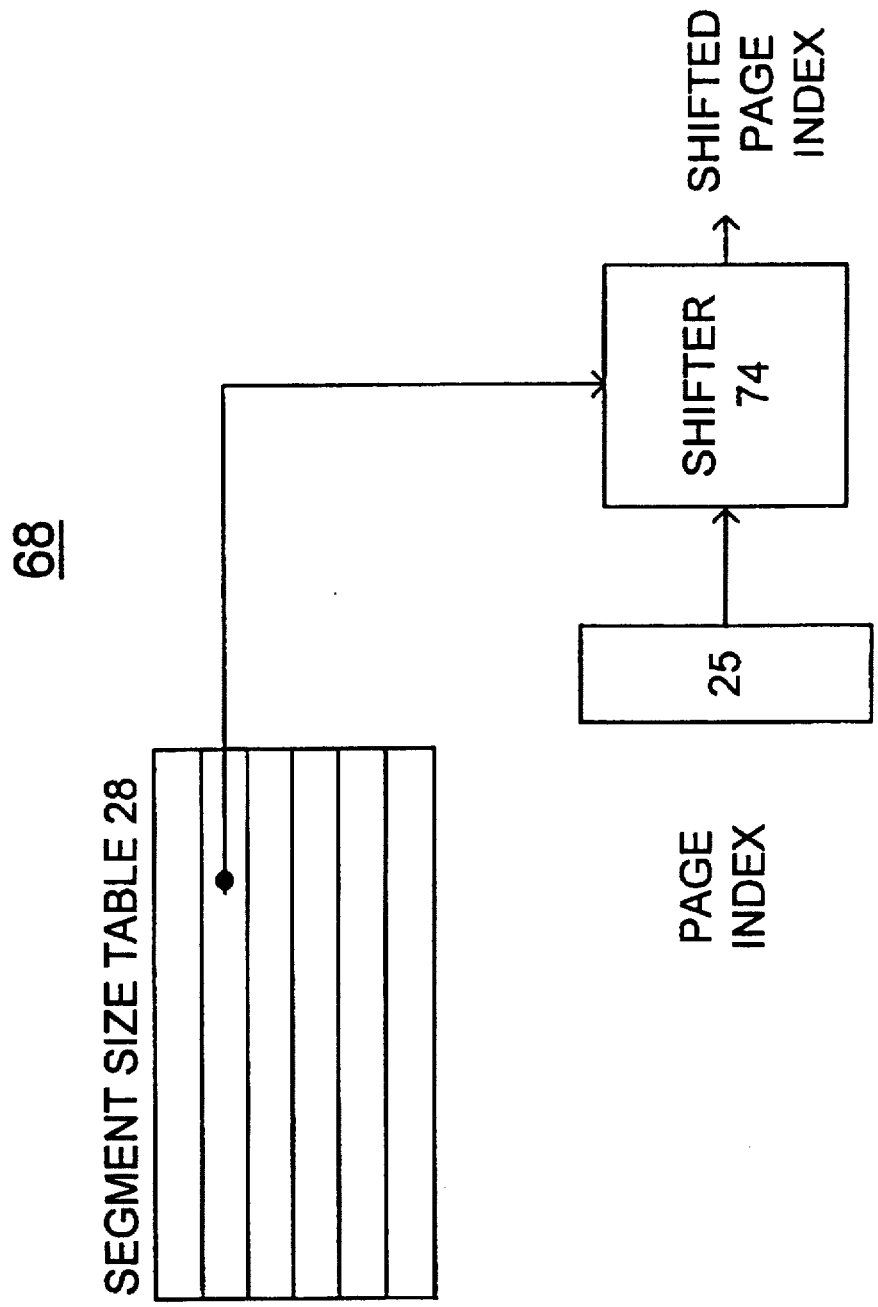
FIG. 14 is a logical block diagram illustrating a shifted page index generation function of the invention.

FIG. 14 is a block diagram illustrating a shifted page index generation function of the invention generally designated by 68. Page index generation function 68 allows page sizes which are powers of 2, in which the page index is multiplied by the power of 2 by shifting the page index the amount which corresponds to the power of two. A segment size table 28 that stored the powers of 2 and a page index designated by 25 are coupled to a shifter 74 that provides a shifted page index. Shifter 74 can provide sequential shifting using a counter, or it may provide a fixed set of shift increments using a multiplexor. The shifted page index generation function 68 can be used instead of the multiplier 30.

Figure 15:
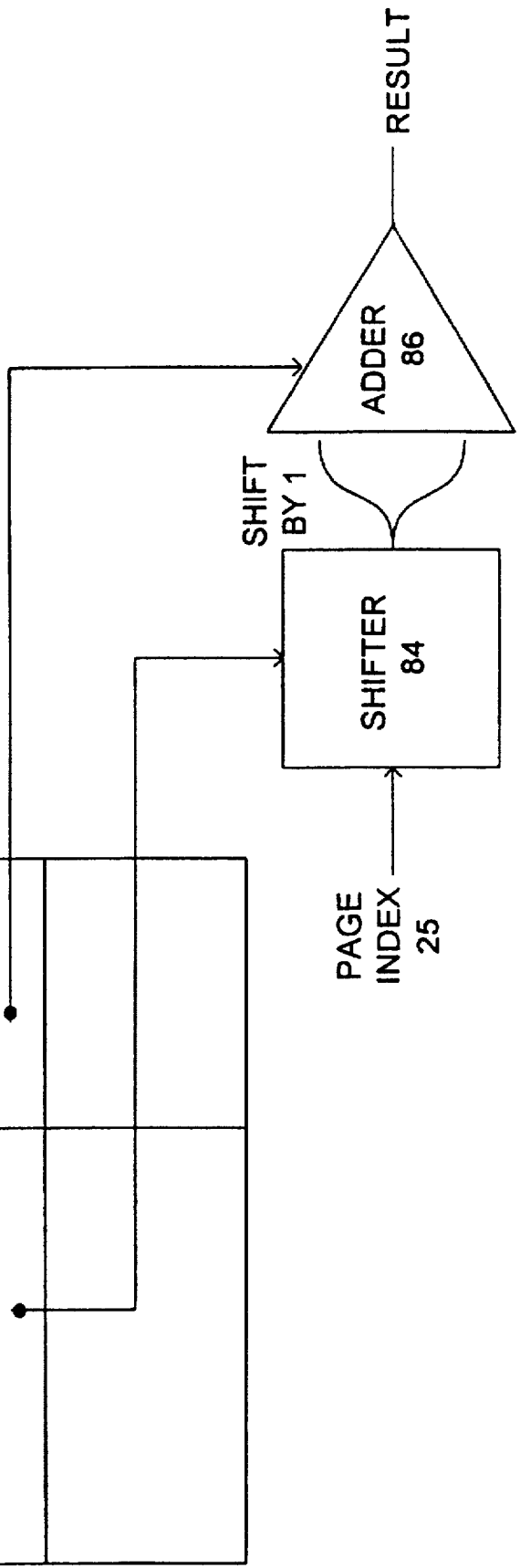
FIG. 15 is a logical block diagram illustrating an alternative shifted page index generation function of the invention.

FIG. 15 is a block diagram illustrating an alternative shifted page index generation function 76. A segment size table 28 stores a power of 2 shift data 80 and an adder bit 82. The page index 25 and power of 2 shift data 80 are coupled to a shifter 84. An adder 86 at the output of shifter 84, under control of the segment size table entry adder bit 82, adds the result of the shifter output to itself shifted back by one place. Function 76 has the effect of providing a sequence of size possibilities at relative factors of 1.5 rather than 2. If the shifter alone is used, 3 bits can encode the shifting of 8 different amounts. An example is provided in the following Table 1.

TABLE 1

| Encoding | Shift Amount | Page Size | Ratio to Previous Size |
|---|---|---|---|
| 0 | 6 | 64 | n.a |
| 1 | 7 | 128 | 2 |
| 2 | 8 | 256 | 2 |
| 3 | 9 | 512 | 2 |

TABLE 1-continued

| Encoding | Shift Amount | Page Size | Ratio to Previous Size |
|---|---|---|---|
| 4 | 10 | 1024 | 2 |
| 5 | 11 | 2048 | 2 |
| 6 | 12 | 4096 | 2 |
| 7 | 13 | 8192 | 2 |

With the addition of the shift/adder enable bit 82, 4 bits provide the capabability for encoding 16 sizes which are closer together in size. This may allow a closer match to the usage statistics. Table 2 provides an example that includes results of the adder bit 82. This implementation will often be considerably smaller than a full multiplier.

TABLE 2

| Encoding | Shift Amount | Add? | Page Size | Ratio to Previous Size |
|---|---|---|---|---|
| 0 | 6 | n | 64 | n.a. |
| 1 | 6 | y | 96 | 1.5 |
| 2 | 7 | n | 128 | 1.5 |
| 3 | 7 | y | 192 | 1.5 |
| 4 | 8 | n | 256 | 1.5 |
| 5 | 8 | y | 384 | 1.5 |
| 6 | 9 | n | 512 | 1.5 |
| 7 | 9 | y | 768 | 1.5 |
| 8 | 10 | n | 1024 | 1.5 |
| 9 | 10 | y | 1536 | 1.5 |
| 10 | 11 | n | 2048 | 1.5 |
| 11 | 11 | y | 3072 | 1.5 |
| 12 | 12 | n | 4096 | 1.5 |
| 13 | 12 | y | 6144 | 1.5 |
| 14 | 13 | n | 8192 | 1.5 |
| 15 | 13 | y | 12288 | 1.5 |

Figure 16:
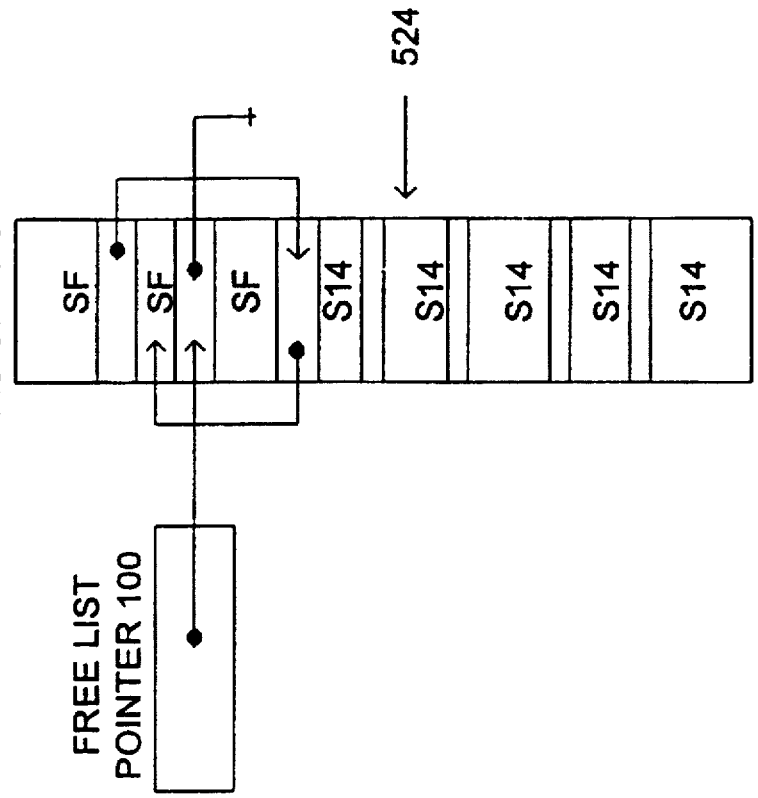
FIG. 16 is a diagram illustrating a base address storage structure with a chain pointer and free lists organized as chains in accordance with the invention.
Figure 16:
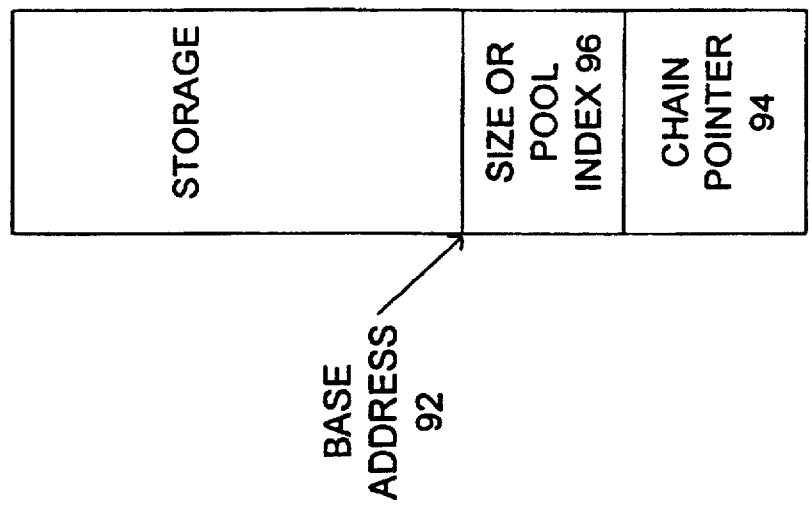

FIG. 16 is a diagram illustrating a base address storage structure 92 including a chain pointer 94, a size or pool index region 94. A free list chain structure 98 includes a plurality of free lists 524 organized as chains. Storage free blocks are designated by SF and storage in use blocks are designated by SIU. A free list pointer 100 is used to point to the free list providing the chain organization.

U.S. patent application Ser. No. 08/221,140, filed Mar. 30, 1994, entitled SYSTEM AND METHOD FOR MANAGEMENT OF A PREDICTIVE SPLIT CACHE FOR SUPPORTING FIFO QUEUES (Docket No. RO993-051) discloses a cache technique for maintaining first-in first-out (FIFO) queues. The above-identified United States patent application is incorporated herein by reference.

Figure 16A:
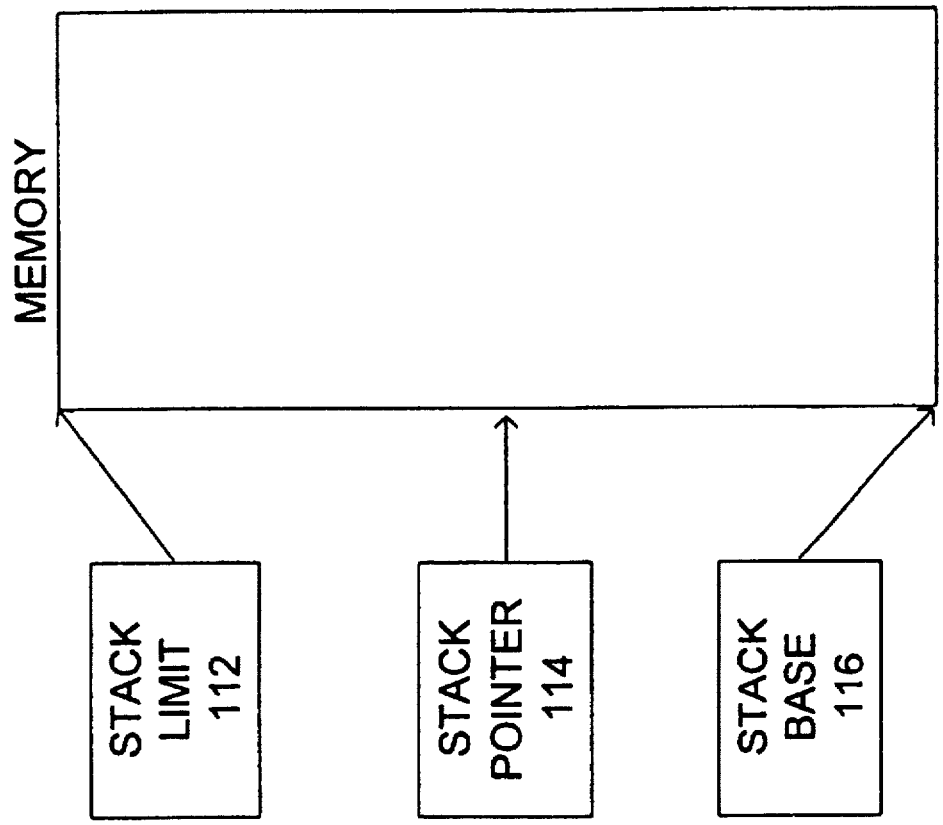
FIG. 16A is a diagram illustrating a base address storage structure with a stack organization of free lists in accordance with the invention.

In FIG. 16A, the free list 524 is organized as a stack in a memory 110 with the top of the stack cached in the memory controller. Elements of the free list 524 are stored in the stack in memory 110. Three pointers are used to create the stack data structure in memory, a stack base pointer 116, a stack limit pointer 112, and a stack entry pointer 114. Optionally, the top of the stack may be cached in a memory controller cache 118. Entries are added to the free list by adding them to the cache 118. When a free list 524 entry is needed, it is removed from the cache. When adding entries to the free list cache 118, if the cache is full, then the free list entry will be stored in the location of memory pointed to by the stack pointer 114 and the stack pointer will be incremented.

When a free list entry is needed it will be taken from the cache 118. If the cache 118 is empty, the stack pointer 114 will be decremented and the entry will be taken from memory location pointed to by the stack pointer. When the stack pointer is manipulated, the stack base pointer 116 and the stack limit pointer 112 will be checked to make sure that there is room in the stack to store the entry, and that there are entries on the stack.

It is also possible to store the free lists in a FIFO memory organization. The predictive split cache described in the above-identified patent application can be used in support of a first-in first-out (FIFO) organization of the various free lists 524 used in this invention. While the stack cached technique requires slightly less storage in the memory controller, the FIFO technique of free list management provides for more even memory usage and for much simpler debugging of system problems.

Figure 17:
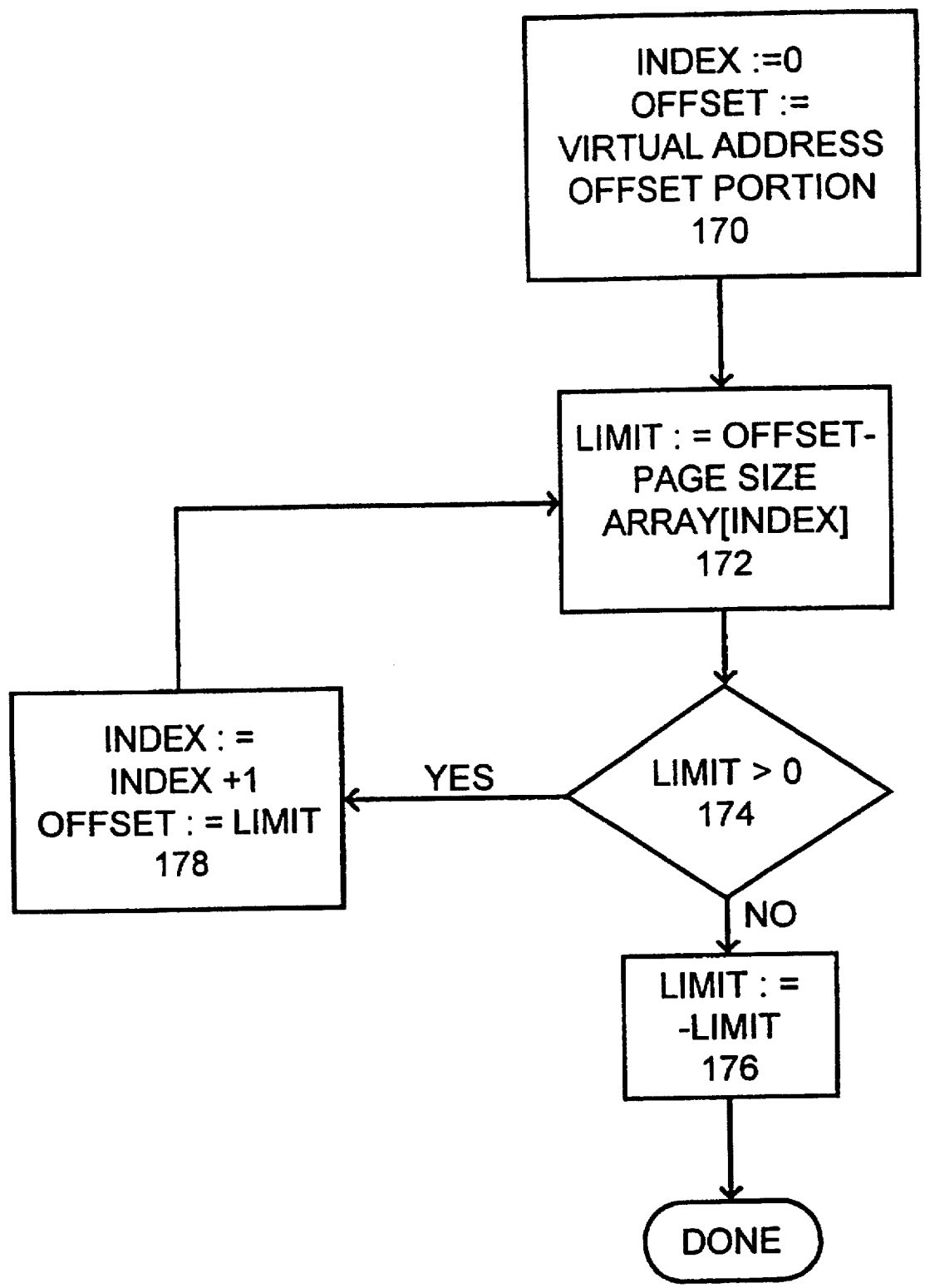
FIG. 17 is a flow chart illustrating sequential steps for generating an Index, Offset and Limit of the invention.

FIG. 17 is a flow chart illustrating sequential selector steps for generating an Index, Offset and Limit receiving inputs of the virtual address offset portion and a page size array. The sequential operations begin at a block 170 with setting Index to zero and the Offset to the virtual address offset portion. The Limit is set to Offset minus a page size array (index) at a block 172. Then it is determined if the Limit is greater than zero. If so, then the limit is set to −Limit at a block 176 to complete the selector steps. Otherwise, when the Limit less than or equal to zero, then the Index is incremented by one and the Offset is set to the Limit at a block 178. Then the sequential steps are repeated by returning to block 172.

While the present invention has been described with reference to details of the embodiments of the invention shown in the drawing, these details are not intended to limit the scope of the invention as claimed in the appended claims.

We claim:

1. An apparatus for implementing virtual memory having multiple selected page sizes comprising:

a virtual address; the virtual address including a map index and a frame offset;

selector means for receiving the virtual address frame offset and the multiple selected page sizes for generating a selector offset and a selector index; said selector means includes multiplier means for multiplying a frame map table page index with a frame size multiplier value;

frame map table means for indexing the virtual address map index and the generated selector index and generating a base address; and means for adding the frame map table means generated base address and the generated selector offset and providing a physical address.

2. An apparatus for implementing virtual memory as recited in claim 1 wherein said selector means provides a sequence of page sizes, each sequential page size having a ratio of 2 to a previous adjacent page size.

3. An apparatus for implementing virtual memory as recited in claim 1 includes a plurality of free memory lists.

4. An apparatus for implementing virtual memory as recited in claim 3 wherein said free memory lists are organized as chains of pointers.

5. An apparatus for implementing virtual memory as recited in claim 3 wherein said free memory lists are organized as stacks and a top of each said stack is cached in a selected storage.

6. An apparatus for implementing virtual memory as recited in claim 3 wherein said free memory lists are organized as cached first-in first-out (FIFO) buffers.

7. An apparatus for implementing virtual memory having multiple selected page sizes comprising:

a virtual address; the virtual address including a map index and a frame offset;

selector means for receiving the virtual address frame offset and the multiple selected page sizes for generating a selector offset and a selector index; said selector means includes means for storing a plurality of predetermined page boundaries;

frame map table means for indexing the virtual address map index and the generated selector index and generating a base address; and means for adding the frame map table means generated base address and the generated selector offset and providing a physical address.

8. An apparatus for implementing virtual memory as recited in claim 7 wherein said selector means includes a plurality of subtractors coupled to said predetermined page boundaries storage means.

9. An apparatus for implementing virtual memory as recited in claim 7 wherein said selector means includes means for identifying an error; said error identifying means including means for receiving said virtual address frame offset and identifying said error responsive to said received virtual address frame offset being greater than each of said predetermined boundary values.

10. An apparatus for implementing virtual memory as recited in claim 8 wherein each of said subtractors receives said virtual memory frame offset and the multiple selected page sizes for generating said selector offset.

11. A method for implementing virtual memory having multiple selected page sizes comprising the steps of:

receiving a virtual address; said virtual address including a map index and a frame offset;

generating a selector offset and a selector index utilizing said virtual address frame offset and a page size array; said step of generating said selector offset and said selector index utilizing said virtual address frame offset and said page size array further includes the step of generating a selector limit utilizing said virtual address frame offset and said page size array;

indexing a frame map table with both the virtual address map index and said generated selector index and generating a base address; and adding said generated base address and said generated selector offset for providing a physical address.

12. A method for implementing virtual memory as recited in claim 11 wherein said step of generating said selector offset and said selector index utilizing said virtual address frame offset and said page size array further includes the step of identifying an error responsive to said received virtual address frame offset being greater than said page size array.

* * * * *